US012411089B2

(12) United States Patent
Fattahi (10) Patent No.: US 12,411,089 B2
(45) Date of Patent: Sep. 9, 2025

(54) METHOD AND APPARATUS FOR CREATING A MICROSCOPIC SAMPLE IMAGE OF A MOLECULAR VIBRATIONAL RESPONSE OF A SAMPLE

(71) Applicant: Max-Planck-Gesellschaft zur Foerderung der Wissenschaften e. V, Munich (DE)

(72) Inventor: Hanieh Fattahi, Munich (DE)

(73) Assignee: Max-Planck-Gesellschaft zur Foerderung der Wissenschaften e.V, Munich (DE)

( * ) Notice: Subject to any disclaimer, the term of this patent is extended or adjusted under 35 U.S.C. 154(b) by 132 days.

(21) Appl. No.: 18/024,120

(22) PCT Filed: Sep. 16, 2020

(86) PCT No.: PCT/EP2020/075849
§ 371 (c)(1),
(2) Date: Mar. 1, 2023

(87) PCT Pub. No.: WO2022/058002
PCT Pub. Date: Mar. 24, 2022

(65) Prior Publication Data
US 2023/0266248 A1    Aug. 24, 2023

(51) Int. Cl.
*G01N 21/63* (2006.01)
*G01N 21/65* (2006.01)
*G02B 21/00* (2006.01)

(52) U.S. Cl.
CPC ........... *G01N 21/65* (2013.01); *G01N 21/636* (2013.01); *G02B 21/0032* (2013.01);
(Continued)

(58) Field of Classification Search
CPC .............. G01N 21/636; G02B 21/0032; G02B 21/0056; G02B 21/0064; G02B 21/0076
See application file for complete search history.

(56) References Cited

U.S. PATENT DOCUMENTS

| 10,401,296 B1* | 9/2019 | Muller ................. G01N 21/65 |
| 2005/0168735 A1* | 8/2005 | Boppart ................ G01N 21/65 356/301 |

(Continued)

FOREIGN PATENT DOCUMENTS

| CN | 118010700 A | * | 5/2024 |
| JP | 2023004473 A | * | 1/2023 |

(Continued)

OTHER PUBLICATIONS

Mamaikin Mikhail, Time-Resolved Microscopy of Near-Infrared to Visible Waveforms, (Year: 2020).*

(Continued)

*Primary Examiner* — Michelle M Iacoletti
*Assistant Examiner* — Maher Yazback
(74) *Attorney, Agent, or Firm* — Caesar Rivise, PC (57) ABSTRACT

A microscopic imaging method for creating a microscopic sample image (1A) of a sample (1) comprises the steps of arranging the sample (1) on a sampling crystal (10); irradiating the sample (1) with excitation laser pulses (2, 3) and generating sample response pulses (4) with a sample response field as a result of an interaction of the excitation laser pulses (2, 3) with the sample (1); irradiating the sampling crystal (10) with probe laser pulses (5) being temporally synchronized with the excitation laser pulses (2, 3) and spatially overlapped with the sample response pulses (4) in the sampling crystal (10), wherein the probe laser pulses (5) have a shorter wavelength than the excitation laser pulses (2, 3); detecting the sample response field by electric-field sampling with the sampling crystal (10), using the sample response pulses (4) and the probe laser pulses (5); and calculating the sample image (1A) based on the detected sample response field, wherein the excitation laser pulses (2, (Continued)

3) have a wavelength in a range from mid-infrared to visible light and the sample response pulses (4) are created by a coherent interaction process induced in the sample (1) and with a fixed phase relationship relative to the excitation laser pulses (2, 3), the sampling crystal (10) is a non-centrosymmetric crystal, the irradiating step is repeated at multiple sample points (1A), wherein at each sample point (1A) the irradiating steps are successively repeated with multiple temporal probe delays of the probe laser pulses (5) relative to the excitation laser pulses (2, 3), at each probe delay, a sum or difference frequency pulse (6) of a sample response pulse (4) and a probe laser pulse (5) is generated, and at each probe delay, a spectral interference pulse (7) is created by a spectral interference of the sum or difference frequency pulse (6) and the current probe laser pulse, the detecting step includes sensing a polarization state of the spectral interference pulse (7) by an ellipsometer device (40) at each probe delay, wherein the local sample response field at the sample point (1A) is derived from the polarization states sensed at all probe delays, and the sample image (1A) is calculated based on the sample response field detected at the sample points (1A). Furthermore, a microscopic imaging apparatus is described.

22 Claims, 3 Drawing Sheets (52) U.S. Cl.
CPC ..... *G02B 21/0056* (2013.01); *G02B 21/0064* (2013.01); *G02B 21/0084* (2013.01); *G01N 2021/655* (2013.01)

(56) References Cited

U.S. PATENT DOCUMENTS

| 2015/0092190 | A1* | 4/2015 | Wright | G01N 21/65 356/301 |
|---|---|---|---|---|
| 2021/0068663 | A1* | 3/2021 | Min | A61K 49/10 |
| 2021/0381986 | A1* | 12/2021 | Doughty | G01N 21/211 |

FOREIGN PATENT DOCUMENTS

| WO | WO-0206778 | A1 * | 1/2002 | ................ G01J 3/44 |
|---|---|---|---|---|
| WO | WO-2018171869 | A1 * | 9/2018 | ........... G01B 9/0201 |

OTHER PUBLICATIONS

Alismail et al. (2019). Near-infrared molecular fieldoscopy of water. Multiphoton Microscopy in the Biomedical Sciences XIX, ed. Periasamy et al. vol. 10882 (SPIE).
Alismail et al. (2020). Multi-octave, CEP-stable source for high-energy field synthesis. Sci Adv., 6, eaax3408.
Barbiero et al. (2019). Towards 45 watt single-cycle pulses from Yb:YAG thin-disk Oscillators. The European Conference on Lasers and Electro-Optics.
Blanchard et al. (2011). Real-time terahertz near-field microscope. Optics Express, 19(9), 8277-8284.
Blanchard et al. (2016). Improving time and space resolution in electro-optic sampling for near-field terahertz imaging. Optics Letters, 41(20), 4645-4648.
Czerwinski et al. (2016). Broadband stimulated Raman microscopy with 0.1 ms pixel acquisition time. Opt. Lett., 41(13), 3021-3024.
Fattahi et al. (2013). Efficient, octave-spanning difference-frequency generation using few-cycle pulses in simple collinear geometry. Optics Letters, 38(20), 4216-4219.
Fattahi et al. (2016). Near-PHz-bandwidth, phase-stable continua generated from a Yb:YAG thin-disk amplifier. Optics Express, 24(21), 24337-24346.
Freudiger et al. (2008). Label-free biomedical imaging with high sensitivity by stimulated raman scattering microscopy. Science, 322, 1857-1861.
Fu et al. (2012). Quantitative chemical imaging with multiplex stimulated raman scattering microscopy. Journal of the American Chemical Society, 134, 3623-3626.
Keiber et al. (2016). Electro-optic sampling of near-infrared waveforms. Nature Photonics, 10, 159-162.
Koettig et al. (2020). Efficient single-cycle pulse compression of an ytterbium fiber laser at 10 MHz repetition rate. Optics Express, 28(7), 9099-9110.
Mamaikin. (2020). Time-resolved microscopy of near-infrared to visible waveforms (Dissertation—Ludwig—Maximilians—Universität München).
Ploetz et al. (2007). Femtosecond stimulated raman microscopy. Applied Physics B: Lasers and Optics, 87, 389-393.
Porer et al. (2014). Shot noise reduced terahertz detection via spectrally postfiltered electro-optic sampling. Optics Letters, 39(8), 2435-2438.
Riek et al. (2015). Direct sampling of electric-field vacuum fluctuations. Science, 350(6259), 420-423.
Schubert et al. (2013). Rapid-scan acousto-optical delay line with 34 kHz scan rate and 15 as precision. Optics Letters, 38(15), 2907-2910.
International Search Report for PCT/EP2020/075849 dated Jun. 17, 2021.
Cho et al. (1990). Direct Time-Resolved Observation of Coherent-Phonon Oscillations in III-V Compounds. In Ultrafast Phenomena VII: Proceedings of the 7th International Conference, Monterey, CA, May 14-17, 1990 (pp. 337-339). Berlin, Heidelberg: Springer Berlin Heidelberg.

* cited by examiner

METHOD AND APPARATUS FOR CREATING A MICROSCOPIC SAMPLE IMAGE OF A MOLECULAR VIBRATIONAL RESPONSE OF A SAMPLE

CROSS-REFERENCE TO RELATED APPLICATIONS

This application is a U.S. National Phase Application of PCT/EP2020/075849, filed Sep. 16, 2020, the content of which is incorporated herein by reference in its entirety for all purposes.

FIELD OF THE INVENTION

The invention relates to a microscopic imaging method for creating a microscopic sample image of a sample, in particular a microscopic sample image of a molecular vibrational response of a sample. Furthermore, the invention relates to a microscopic imaging apparatus for creating a microscopic sample image of a sample. Applications of the invention are available e.g. in the fields of creating diffraction limited, chemically sensitive images labelling the sample or using structured light.

TECHNICAL BACKGROUND

In the present specification, reference is made to the following prior art illustrating the technical background of the invention, in particular relating to microscopic imaging a molecular vibrational response of a sample:

[1] Freudiger, C. W., Min, W., Saar, B. G., et al. 2008, Science, 322, 1857;
[2] Ploetz, E., Laimgruber, S., Berner, S., Zinth, W., & Gilch, P. 2007, Applied Physics B: Lasers and Optics, 87, 389;
[3] Czerwinski, L., Nixdorf, J., Florio, G. D., & Gilch, P. 2016, Opt. Lett., 41, 3021;
[4] Fu, D., Lu, F.-K., Zhang, X., et al. 2012, Journal of the American Chemical Society, 134, 25 3623;
[5] Blanchard, F., Doi, A., Tanaka, T., et al. 2011, Optics Express, 19, 8277;
[6] Blanchard, F. & Tanaka, K. 2016, Optics Letters, 41, 4645;
[7] Porer, M., Menard, J.-M., & Huber, R. 2014, Optics letters, 39, 2435;
[8] Riek, C., Seletskiy, D. V., Moskalenko, a. S., et al. 2015, Science, 350, 420;
[9] Keiber, S., Sederberg, S., Schwarz, A., et al. 2016, Nature Photonics, 10, 159;
[10] Alismail, A., Wang, H., Barbiero, G., et al. 2019, in Multiphoton Microscopy in the Biomedical Sciences XIX, ed. A. Periasamy, P. T. So, & K. Koenig, Vol. 10882 (SPIE), 110;
[11] Alismail, A. et al., 2020, Sci. Adv. 6, eaax3408, 14 Feb. 2020;
[12] Barbiero, G., Raja N. Ahmad, Wang, H., et al., The European Conference on Lasers and Electro-Optics, 2019;
[13] Fattahi, H., Schwarz, A., Keiber, S., & Karpowicz, N. 2013, Optics Letters, 38, 4216;
[14] Fattahi, H. et al. 2016, Optics Express, 24, 24337;
[15] Köttig F. et al. 2020, Optics Express, vol. 28, No. 7, 30 Mar. 2020, p. 9099; and
[16] Schubert O. et al. 2013, Optics Letters, vol. 38, No. 15, 1 Aug. 2013, p. 2907.

Fluorescence microscopy is a known tool to advance the understanding of the composition, dynamic, and physiology of the living biological cells. It affords a high specificity and sensitivity due to the large electronic transition dipole moments, and a background-free signal. Spatial resolution in conventional fluorescence microscopes is defined by the Abbe diffraction limit of ($\lambda$/2NA), where $\lambda$ is the wavelength of the light and NA is the numerical aperture of the imaging system. According to Abbe's formula, light at higher frequencies allows for higher spatial resolution. However, biological phototoxicity scales linearly by the frequency of the laser. Furthermore, it is well known that light of relatively long wavelengths at 700-900 nm or 1200-1700 nm spectral range (known as the water window) has the best penetration depth in biological systems, as water absorption is minimized in these regions. Therefore, these two contradictory factors influence the application of fluorescence microscopy with biological materials.

By employing structured light or statistical techniques (like STED, RESOLF, or PALM microscopy), the imposed barrier by Abbe's formula on spatial resolution has been circumvented enabling super-resolution microscopy with a spatial resolution down to 10 nm. However, in super-resolution microscopy the sample is exposed to either very intense laser fields or labeled with bulky probe molecules or both, which can perturb the natural function of the molecules. Most small molecules such as nucleoside, amino acids, fatty acids, choline, glucose, cholesterol, and small-molecule drugs are intrinsically non-fluorescent and have to be labeled. Furthermore, to acquire information about chemical composition of a complex sample, several different probe molecules have to be used, which makes the experiment and the subsequent data analysis complicated and cumbersome.

Vibrational microscopy based on infrared (IR) absorption or near-infrared (NIR) scattering allows for non-perturbative label-free identification of complex molecular compositions and structures and offers intrinsic chemical selectivity due to the specific vibrational frequency of different molecules. Stimulated Raman scattering (SRS) in the visible spectral range has been a method of choice for imaging, due to its lower water absorption cross-section, higher penetration depth, and most importantly higher spatial resolution compared to infrared imaging [1]. It has been shown that the entire molecular fingerprint of sample can be excited and detected simultaneously by employing broadband Raman excitation pulses [2, 3, 4].

In SRS microscopy, the detected loss/gain of the initial fields is strictly linearly proportional to the analyte concentrations allowing for generation of a quantitative chemical map of the sample. However, Raman effect is extremely weak. With a typical photon conversion efficiency lower than 1 in $10^8$ photons, highly sensitive detection schemes are required. The detection sensitivity of broadband SRS readily approaches the shot-noise limit by taking advantage of high-frequency modulation transfer schemes [8,9] in frequency domain or time domain schemes like dual comb [10, 11] or interferometric detection [12]. However, all above-mentioned schemes attain spatial resolution values at or above the diffraction limit of the Raman excitation pulses, leaving the era of non-perturbative, sub-diffraction spectro-microscopy, rich with chemical information, unexplored.

Two-dimensional time-domain imaging (electro-optic imaging) is a standard technique in terahertz (THz) spectral range providing sub-diffraction limit spatial resolution [5, 6]. Here, the sample is placed on the surface of an electro-optic sampling (EOS) crystal and the near-field information is spatiotemporally gated in the electro-optic sampling crystal before the diffraction of the THz beam [7]. The transmitted complex THz field is retrieved from the detected polarization rotation of the transmitted probe laser pulses in the far field and the spatial resolution of the THz image is defined by the diffraction limit of the short wavelength probe laser pulses. As a limitation of this technique, Terahertz excitation doesn't provide any information about molecular constituent of a sample as molecular absorptions happens in infrared, near-infrared and visible spectral range. Therefore, conventional THz microscopy is mainly used for plasmonics and imaging of e.g. nanoparticles.

Moreover, it is known that EOS provides an unparalleled sensitivity and dynamic range for spectroscopy and has been successful in detection of faint signals such as vacuum fluctuation's field at shot-noise limit [8]. Its extension down to petahertz (PHz) frequencies has been shown [9, 10].

OBJECTIVE OF THE INVENTION

Objectives of the invention are to provide an improved microscopic imaging method for creating a microscopic sample image of a sample and an improved microscopic imaging apparatus for microscopic imaging a sample, avoiding disadvantages and limitations of conventional techniques and/or providing new or extended applications of microscopic imaging. In particular, the microscopic imaging is to be capable of obtaining microscopic sample images, in particular molecular vibrational response images, with sub-micrometer spatial resolution, in particular sub-diffraction-resolution with reference to wavelengths of sample excitation, while avoiding high intensity laser fields, which could impair or destroy the sample, and avoiding labelling the sample with probe molecules. Furthermore, the microscopic imaging is to be implemented with increased selectivity, increased sensitivity, increased spectral coverage and/or high contrast. The microscopic imaging is to be capable to be applied with sensitive molecular samples, in particular biological samples. According to a further particular aspect, broadband microscopic imaging is to be obtained, thus increasing the information content, e.g. on molecular components included in the sample, molecular dynamics in the sample and/or sample composition, potentially retrieved from the sample.

SUMMARY OF THE INVENTION

The above objectives are solved by a microscopic imaging method and a microscopic imaging apparatus of the invention.

According to a first general aspect of the invention, the above objective is solved by a microscopic imaging method for creating a microscopic image of a sample, in particular a biological sample, to be investigated, comprising the steps of arranging the sample on a sampling crystal, irradiating the sample with excitation laser pulses and generating sample response pulses with a sample response field as a result of an interaction of the excitation laser pulses with the sample, irradiating the sampling crystal with probe laser pulses being temporally synchronized with the excitation laser pulses and spatially overlapped with the sample response pulses in the sampling crystal, wherein the probe laser pulses have a shorter wavelength than the excitation laser pulses, detecting the sample response field by electric-field sampling with the sampling crystal, using the sample response pulses and the probe laser pulses, and calculating a sample image based on the detected sample response field.

According to the invention, the excitation laser pulses have a wavelength in a range from mid-infrared to visible light, the sample response pulses are created by a coherent interaction process induced in the sample and with a fixed phase relationship relative to the excitation laser pulses, and the sampling crystal is a non-centrosymmetric crystal. Furthermore, the irradiating step is repeated at multiple sample points, where the sample and the probe laser pulses are focussed to the sampling crystal, wherein at each sample point the irradiating steps are successively repeated with multiple temporal probe delays of the probe laser pulses relative to the excitation laser pulses. At each probe delay, a sum or difference frequency pulse of a current sample response pulse and a current probe laser pulse is generated, and at each probe delay, a spectral interference pulse is created by a spectral interference of the sum or difference frequency pulse and the current probe laser pulse. Furthermore, the detecting step includes sensing a polarization state of the spectral interference pulse by an ellipsometer device at each probe delay, wherein the local sample response field at the sample point is derived from the polarization states sensed at all probe delays. Furthermore, the sample image is calculated based on the sample response field detected at the sample points.

According to a second general aspect of the invention, the above objective is solved by a microscopic imaging apparatus, being configured for creating a microscopic image of a sample to be investigated. The microscopic imaging apparatus, comprises a sampling crystal being arranged for accommodating the sample, an excitation laser source being configured for irradiating the sample through imaging optics with excitation laser pulses, so that sample response pulses with a sample response field can be generated as a result of an interaction of the excitation laser pulses with the sample, a probe laser source being configured for irradiating the sampling crystal through the imaging optics with probe laser pulses and being temporally synchronized with the excitation laser source, so that the probe laser pulses can be spatially overlapped with the sample response pulses in the sampling crystal, wherein the probe laser source is adapted for creating the probe laser pulses with a wavelength shorter than the excitation laser pulses, an ellipsometer device being configured for detecting the sample response field by electric-field sampling with the sampling crystal, using the sample response pulses and the probe laser pulses, a computer device being configured for calculating a sample image based on the detected sample response field, and a control device being configured for controlling the excitation laser source, the probe laser source and the detector device.

According to the invention, the excitation laser source is configured for creating the excitation laser pulses in a wavelength range from mid-infrared to visible light and for irradiating the sample with the excitation laser pulses, in particular such that the sample response pulses can be created by a coherent interaction process induced in the sample and with a fixed phase relationship relative to the excitation laser pulses. The sampling crystal is a non-centrosymmetric crystal. The imaging optics are adapted for focussed irradiation of the sample and the sampling crystal. A delay device is arranged for irradiating the sampling crystal with the probe laser pulses with an adjustable delay relative to the excitation laser pulses. The control device, like e.g. a control computer unit, is configured for repeating the irradiating steps at multiple sample points, such that at each sample point the irradiating steps are successively repeated with multiple temporal probe delays of the probe laser pulses relative to the excitation laser pulses, at each probe delay, a sum or difference frequency pulse of a current sample response pulse and probe laser pulse is generated, and at each probe delay, a spectral interference pulse is created by a spectral interference of the sum or difference frequency pulse and the current probe laser pulse. The ellipsometer device is arranged for sensing a polarization state of the spectral interference pulse at each probe delay, wherein the local sample response field at the sample point can be derived from the polarization states sensed at all probe delays. The computer device is configured for calculating the sample image based on the sample response field detected at the sample points. Preferably, the microscopic imaging apparatus or an embodiment thereof is configured for conducting the microscopic imaging method of the first general aspect of the invention or an embodiment thereof.

Advantageously, the invention provides a label-free super-resolution field microscopy which allows imaging a sample with sub-diffraction limit spatial resolution without requiring high excitation intensities or complex labelling molecules. Irradiating the sample with the excitation laser pulses in the wavelength range from mid-infrared to visible light allows the excitation of electronic and/or vibrational excited states resulting in the creation of the sample response pulses being specific for molecules included in the sample. By specific frequency components and amplitudes thereof, the light field of the sample response pulses carries information on the sample-specific excited states, which subsequently is read out by field sampling. Advantageously, the information amount is comparable with the information content obtainable with conventional vibrational spectroscopy, like SRS. However, in contrast to the spatial resolution limitation of e.g. a Raman microscope, the field sampling with the short wavelength probe laser pulses provides a substantially increased spatial resolution. As a further advantage, the probe laser pulse need little power for sampling only, so that a damage of the sample can be avoided.

Preferably, the number of temporal probe delays of the probe laser pulses relative to the excitation laser pulses is selected in dependency on the spectral resolution to be obtained. As an example, 3500 irradiating steps with a temporal distance of 428 attoseconds are provided at each sample point. Preferably, the probe laser pulses have a shorter pulse duration than the cycle of the excitation laser pulses to avoid any temporal smearing.

The inventive imaging technique advances microscopy by accessing molecular fingerprints with an unprecedented selectivity and sensitivity, increased spectral coverage, high contrast, and sub-diffraction limit spatial resolution to enhance the understanding of fundamental processes in molecules, e.g. in cell biology. Thus, particular advantages are obtained in the field of imaging biological samples.

In contrast to conventional label-free microscopy, the invention provides an access to molecular dynamic and composition, in particular in live biological systems, at high spatial resolution. Advancing label-free microscopy into the domain of basic molecular constituents e.g. of biological systems, and their dynamic is obtained by the inventive field sampling scheme. The inventors have found that electric-field imaging at PHz frequencies can be made available in particular by the excitation and probe laser pulses, in particular by employing broadband, e.g. MHz-rate, waveform controlled sub-cycle laser pulses. The resultant sub-micrometer label-free imaging technique is capable of recording images of molecular composition of any sample, non-perturbatively with sub-diffraction limit spatial resolution.

The sample to be imaged may comprise any material in liquid or solid phase and in solid, liquid or gaseous environment, in particular an organic material, particularly preferred a biological material. Biological material may comprise a biological cell, a cell component, like e.g. a cell membrane, cytoplasma, a nucleus and/or parts thereof, like a biological macromolecule, or a cell group, like a cell aggregate or tissue.

With preferred, but not limiting examples, the inventive microscopy technique can be used for lipid cell biology and tumor studies, for studying drug-cell interaction in living cells, and/or for sensing discrete substances, like e.g. neurotransmitters in cells or tissues. For example, by taking advantage of differences in lipid density and protein density, tumor margins can be imaged in an unstained tissue. Higher spatial resolution has a key role in cancerous cell differentiation studies. Drug-cell interactions can be studied by tracking the drug delivery in the silent spectral region of the cell. The high detection sensitivity allows for capturing metabolomic differences that can have important consequences for health and disease. For example, the inventive microscope can be used to detect and characterize the very early changes in the transforming cell to help developing diagnostic tools and therapeutic strategies, as altered metabolism is one of the hallmarks of cancer cells. As a further example, the invention can be applied for studying the concentration and distribution of neurotransmitters, specifically acetylcholine, as they are crucial component for mapping the neural circuit.

Preferably, the sample is arranged directly on the sampling crystal (i.e. the sample is in contact with the sampling crystal), thus facilitating near-field detection of the sample response pulses from the sample. Particularly preferred, the sample is arranged in a fixed state on the sampling crystal serving as a sample holder. The sample may be covered by a transparent material, like a cover glass for microscopy. Any covering material of the sample can be considered in dispersion control for adjusting the excitation laser and probe laser pulses in the sample and sampling crystal.

The sample may have a thickness providing an optical density which allows a transmission of the excitation laser and probe laser pulses, e.g. a thickness in a range from 10 nm to 500 µm. Accordingly, the polarization states of the spectral interference pulses are sensed with transmission geometry, wherein the ellipsometer device is arranged on a sampling crystal side of the sample in opposition to a side of the sample irradiated with the excitation laser and probe laser pulses. Alternatively, the sample may have a larger thickness. In this case, a reflection geometry of sensing the polarization states of the spectral interference pulses is provided, wherein the excitation laser and probe laser pulses are directed to the sample through the sampling crystal. In this case, the ellipsometer device is arranged and the sample is irradiated on the sampling crystal side.

Contrary to electro-optic sampling used e.g. in THz microscopy, present field sampling at higher frequencies (from mid-infrared to visible spectral range) is based on a different physical effect. In this case, the non-centrosymmetric crystal serves as a nonlinear medium being adapted for sensing a polarization state of the spectral interference pulses. The non-centrosymmetric sampling crystal is e.g. a crystal having inherent birefringence, like e.g. a BBO (barium borate) or Quartz (preferred for detection in VIS and NIR ranges), or GaSe for detection in MIR range.

According to a preferred embodiment of the invention, the coherent interaction process for creating the sample response pulses comprises stimulated Raman scattering. With this embodiment, the excitation laser pulses comprise pump pulses and Stokes pulses and the coherent interaction process comprises the stimulated Raman scattering, induced in the sample by the pump and Stokes pulses. In terms of apparatus features, the excitation laser source is configured for creating the excitation laser pulses comprising the pump pulses and the Stokes pulses. The intensity of the Stokes pulses is changed by SRS, and the sample response pulses are provided by the changed Stokes pulses. In particular by the configuration of the control device, at each sample point, sum or difference frequency pulses are created by phase-matched, second order nonlinear interaction between the sample response pulses, in particular the changed Stokes pulses, and the probe laser pulses, and the spectral interference pulses are created by superimposing the sum or difference frequency pulses with the probe laser pulses.

Advantageously, a broad range of specific vibrational transitions can be accessed by stimulated Raman scattering. The excitation laser pulses can be tuned into the less-phototoxic 1 µm region, while low-power UV probe laser pulses will be used to achieve high spatial resolution at video-rate. Preferably, the probe laser pulses comprise ultrashort UV pulses with a duration below 3 fs to probe the molecular excitation with sub-diffraction spatial resolution. The detection sensitivity and dynamic range are enhanced by employing high peak power pulses and the inventive field detection technology. A lot of molecules are readable, and absorption of water is low (cross section of water absorption is low) in wavelength range of Raman scattering. According to a further advantage, stimulated Raman scattering, as a non-linear technique, provides additional spatial resolution.

The application of the invention is not restricted to employing stimulated Raman scattering. Alternatively, any other coherent, i.e. phase keeping interaction process of the excitation laser pulses with the sample can be used, like e.g. overtone excitation, in particular water overtone NIR detection, or MIR excitation.

According to a particularly preferred embodiment of the invention, the Stokes laser pulses are broadband laser pulses. The broadband Stokes laser pulses cover a wavelength range of e.g. 850 nm to 1300 nm. The broadband Stokes pulses are applied in combination with narrowband pump pulses for achieving spectral resolution. Advantageously, broadband Stokes laser pulses facilitate a simultaneous access to the entire molecular fingerprint, bond region, silent region, and low-frequency region by stimulated Raman scattering. Alternatively, narrowband Stokes pulses, provided for achieving spectral resolution, and broadband pump pulses can be used, which allow simultaneous broadband stimulated Raman excitation.

If, according to a further preferred variant of the invention, the excitation and probe laser pulses are focussed with reflective optics, imaging can be improved by avoiding chromatic aberration. If the imaging optics comprise the reflective optics, particular advantages even in case of using the broadband Stokes laser pulses are obtained. Employing an all reflective microscope objective allows for dispersionless delivery of all the broadband pulses to the sample without chromatic aberration.

According to a further preferred embodiment of the invention, the probe laser source creates the probe laser pulses with a centre wavelength equal to or below half of the central wavelength of excitation laser pulses. Advantageously, a substantial increase in spatial resolution can be obtained by this shift of the probe laser pulses towards short wavelengths.

Preferably, the excitation and probe laser pulses are created with a repetition frequency of at least 1 MHz. Repetition frequencies equal to or above this limit have advantages in terms of and enhanced signal to noise ratio due to 1/f noise low. Also the higher repetition rate, reduces the averaging time and allows for faster scan. Alternatively, lower repetition frequencies can be used, e.g. down to 100 kHz or even lower, down 10 kHz.

According to a further particularly preferred embodiment of the invention, the excitation and probe laser pulses are created by one single laser source device. In terms of the microscopic imaging apparatus, the single laser source device provides both of the probe laser source and the excitation laser source. In case of the preferred SRS embodiment of the invention, the single laser source device advantageously simultaneously produces the Stokes pulses, the pump pulses and the probe laser pulses. The single laser source device includes one single main laser oscillator creating an output, which is used for producing all of the Stokes, pump and probe laser pulses. Advantageously, synchronization of the pulses and producing the pulses with a fixed phase relationship is facilitated by employing the single laser source device.

Preferably, the laser source device comprises a solid state or fiber laser being configured for creating initial laser pulses with a centre wavelength in near infrared spectra range and a pulse duration below 500 fs. The solid state or fiber laser provides the main laser oscillator of the laser source device. Furthermore, the laser source device comprises a first gas-filled optical fibre and an arrangement of chirped mirrors being configured for temporally compressing the initial laser pulses to a pulse duration below 10 fs. Furthermore, the laser source device comprises a difference frequency generation unit being configured for creating stabilized CEP laser pulses with constant carrier-phase-relationship by intra-pulse difference frequency generation of the temporally compressed laser pulses. Furthermore, the laser source device comprises a second gas-filled optical fibre being configured for spectrally broadening the CEP laser pulses with, so that broadband pulses are created. Broadband beam splitters are provided which are configured for splitting the broadband pulses to different spectral regions of the excitation and probe laser pulses.

With a further advantageous embodiment of the invention, dispersion setting is provided such that the probe laser pulses have maximum frequency compression in the sampling crystal. At least one dispersion setting component is arranged for providing the dispersion setting. Advantageously, dispersion management of the short probe laser pulses and accordingly their duration defines the temporal resolution of the sampled excitation pulses and consequently the spectral resolution of the Raman spectrum. Preferably, at least one broadband dispersive mirror is used as dispersion setting component for temporal compression of the probe laser pulses at the nonlinear sampling medium.

Further advantages for reducing noise in sensing the local sample response fields are obtained, if according to a further preferred embodiment of the invention, at least one of the excitation laser pulses and the probe laser pulses are subjected to a modulation, and the polarization states of the spectral interference pulses are sensed with frequency locking relative to the modulation. Preferably, a modulation device is provided, e.g. between the laser source device and the sampling crystal, for applying the modulation. With preferred examples, the excitation pump pulses (which preferably is narrowband) are modulated by an acousto-optic modulator (AOM) or a chopper, e.g. at the frequency equal to half of the repetition rates of the laser, and the modulated signal is preferably detected at the ellipsometer by using a lock-in amplifier.

According to a further modification, which can be provided e.g. in addition and as an alternative to noise reduction, even higher spatial resolution can be gained. To this end, the multiple spectral interference pulses are preferably created by a spectral interference of the higher harmonic of the sample response pulses and higher harmonics of the probe laser pulses in the sampling crystal.

The sample image (microscopic image of the sample) to be obtained comprises image data (a map with one, two or three dimensions), wherein at least one sample property, in particular at least one vibrational response, is assigned to each spatial sample position. The sample image may comprise a static image, i.e. one image representing the sample at the time of collecting the image data. Alternatively, a dynamic (moving) image can be collected. Thus, with an advantageous embodiment of the invention, multiple sample images are collected with temporal resolution. The control device is configured for controlling the excitation laser source, the probe laser source and the ellipsometer device such that the multiple sample images are collected. The dynamic image includes a sequence of multiple successive sample images, so that e.g. temporal sample changes can be detected in an advantageous manner.

BRIEF DESCRIPTION OF THE DRAWINGS

Further details and advantages of the invention are described in the following with reference to the attached drawings, which schematically show in.

Features of preferred embodiments of the invention are described in the following with exemplary reference to a configuration, wherein a single laser source device serves as both of an excitation laser source and a probe laser source. The implementation of the invention is not restricted to this configuration, but rather possible with separate excitation and probe laser sources being synchronized with each other. Furthermore, exemplary reference is made to a configuration, wherein stimulated Raman scattering (SRS) is employed as an interaction of excitation laser pulses with a sample. The invention is not restricted to SRS, but rather can be implemented also with other coherent interactions between the excitation laser pulses and the sample. With the preferred embodiment of employing SRS, exemplary reference is made to an embodiment, wherein broadband Stokes pulses and narrowband pump pulses are produced. Alternatively, the invention can be implemented with broadband pump pulses and narrowband Stokes pulses.

Figure 1:
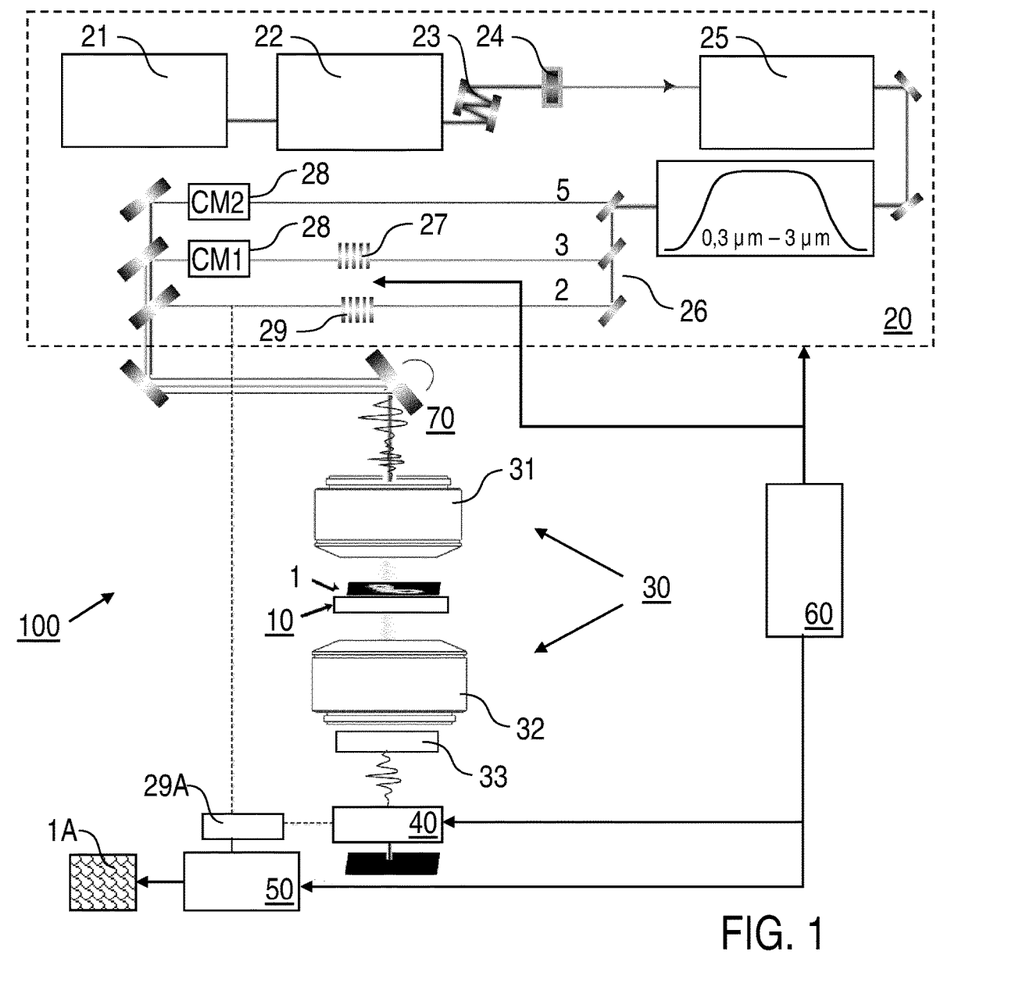
FIG. 1: an overview of the microscopic imaging apparatus according to preferred embodiments of the invention.

It is emphasized that the implementation of the invention is not restricted to a transmission geometry, as illustrated in FIG. 1, but rather possible in an analogue manner with a back reflection geometry. In particular, probe laser pulses propagate parallel or anti-parallel to excitation laser pulses and can be collected for detection in epi or anti-epi configuration.

Microscopic Imaging Apparatus

The microscopic imaging apparatus 100 comprises, as schematically shown in FIG. 1, the sampling crystal 10 for accommodating the sample 1 (see also cross-sectional view in FIG. 2), the laser source device 20 for irradiating the sample 1 with excitation laser pulses 2, 3 and probe laser pulses 5, imaging optics 30 with an irradiation objective 31 and a detection objective 32, an ellipsometer device 40, a computer device 50, a control device 60 and a scanning device 70.

Figure 2:
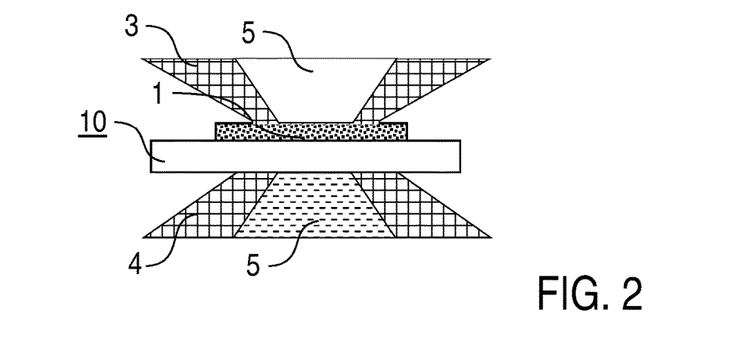
FIG. 2: an enlarged view of the beam paths of excitation laser pulses and probe laser pulses at the sample and the sampling crystal.

The sampling crystal 10 is a plane plate of e.g. BBO with a thickness of 20 μm and a size of 25 mm*5 mm. It is arranged perpendicular to the beam path of the excitation and probe laser pulses 2, 3 and 5 between the irradiation and detection objectives 31, 32. The sample 1, optionally within a liquid film, is placed on the surface of the sampling crystal 10 for near-field imaging. The sample 1 is irradiated with excitation laser pulses comprising pump pulses 2 (not shown in FIG. 2) and Stokes pulses 3 (see FIG. 2) and probe laser pulses 5 (see FIG. 2). The outer checkered beam of FIG. 2 shows the diffraction limited focus of the Stokes pulses 3 and the inner white beam shows the diffraction limited probe laser pulses 5.

The laser source device 20 comprises a solid state laser 21 (or alternatively a fiber laser, see e.g. [15]) for creating initial driving pulses with a centre wavelength in near infrared spectra range and a pulse duration below 500 fs, a first gas-filled optical fibre 22 and an arrangement of chirped mirrors 23 for temporally compressing the initial laser pulses to a pulse duration below 10 fs, a difference frequency generation unit 24 for creating stabilized CEP laser pulses with constant carrier-phase-relationship by intrapulse difference frequency generation of the temporally compressed laser pulses, a second gas-filled optical fibre 25 for spectrally broadening the CEP laser pulses, so that broadband pulses are created, and broadband beam splitters 26 for splitting the broadband pulses to different spectral regions of the excitation and probe laser pulses 2, 3 and 5.

With more details, the solid state laser 21 comprises a diode-pumped, spectrally broadened Yb:YAG laser 21 with 20 μJ pulse energy, operating at 2 MHz and with a pulse duration of 350 fs. The full potential of the first gas-filled optical fibre 22, like a single-ring photonic crystal fiber, is used to spectrally broaden the laser pulses to few-cycle pulses (e.g. as described in [12]). With the chirped mirrors 23, the pulses are shortened to a duration of 6 fs and 16 μJ pulse energy (see e.g. [15]). The short pulses drive the intrapulse difference frequency generation unit 24 (DFG stage, e.g. as described in [13]) for generation of the passive CEP-stable pulses. Considering e.g. 50% optical throughput for external spectral broadening of the laser and 10% optical efficiency at difference frequency generation unit 24, broadband, CEP-stable, 1 μJ pulses at 2 MHz repetition rate can be generated. The CEP-stable pulses are consequently broadened in the second gas-filled optical fibre 25 to achieve multi-octave pulses spanning a spectrum from MIR, e.g. 3 μm, down to ultra-violet (UV) e.g. 0.3 μm (e.g. as described in [14]). In addition to the broad spectral coverage, the frontend operates at MHz repetition rates due to interest in video-rate imaging and 1/f noise law.

With the broadband beam splitters 26, the broadband pulses are split to different spectral regions of the excitation laser pulses 2, 3 and probe laser pulses 5, which are inherently synchronized. In particular, the system simultaneously produces CEP-stable, NIR broadband excitation pulses, including pump pulses 2 and Stokes pulses 3 for SRS and ultra-short, UV probe laser pulses 5 for field sampling.

The spectral dispersion at least of the broadband Stokes pulses 3 is engineered in at least one dispersion setting component 28 in the beam paths of excitation laser pulses 3 and probe laser pulses 5. Preferably, each of the beam paths of excitation laser pulses 3 and probe laser pulses 5 includes a dispersion setting component 28, like the chirped mirror compressors CM1 and CM2, for compensating the dispersion on the broadband Stocked and broadband probe pulses. In addition, the narrow-band pump pulses 2 are temporally confined to 3 ps by employing an ethalon (not shown).

In the beam path of the pump pulses 2, a modulation device 29 is provided, comprising e.g. an AOM, for modulating the power of the pump pulses 2, e.g. at 1 MHz, and for creating a lock-in signal delivered to a lock-in amplifier 29A connected with the ellipsometer device 40. Advantageously, employing a frequency lock-in system and spectral filtering of the overlapped spectra in field sampling enhances the detection signal to noise ratio and the technical noise can be suppressed to the level of the shot noise of probe pulses. The modulation device 29 provides a basis for shot-noise-limited sensing at the ellipsometer device 40.

In the beam path of the Stokes pulses 3, an adjustable delay device 27 is provided for periodically introducing a mutual delay of the Stokes pulses 3 relative to the probe laser pulses 5. The delay device 27 comprises e.g. a piezo delay stage or acousto-optical delay (see e.g. [16]).

The pulses 2, 3, 5 are coupled via the scanning device 70, which comprises e.g. a raster scanner like in confocal microscopy, into the irradiation objective 31 for irradiating the sample 1 on the sampling crystal 10. As shown in FIG. 2, short probe laser pulses 5 propagate with pump 2 and Stokes 3 pulses through the sample 1. The probe laser pulses 5 contain higher frequencies compared to broadband Stokes pulses 3. Therefore, they have a shorter Rayleigh range and a smaller diffraction limit, resulting in higher axial and lateral resolutions. Thus, the lateral spatial resolution is defined by diffraction limit of the probe laser pulses 5 and the numerical aperture of the irradiation objective 31.

The excitation Raman pulses 2, 3 alongside the probe laser pulses 5 are raster-scanned through the sample 1 and the sample response pulses 4 (stimulated Raman gain (for broadband Stokes pulses)) containing molecular information specific to the irradiated area by probe beam is retrieved by field sampling in each sample point. Employing broadband excitation pulses, e.g. Stokes pulses 3, decreases the scanning time for quantitative sub-cellular imaging of the entire molecular vibrational modes of the sample 1, substantially. In addition, the measured complex-electric-field of the signal contains molecular phase information or the retardation with which each molecular composition reacts to the external excitation.

Figure 4:
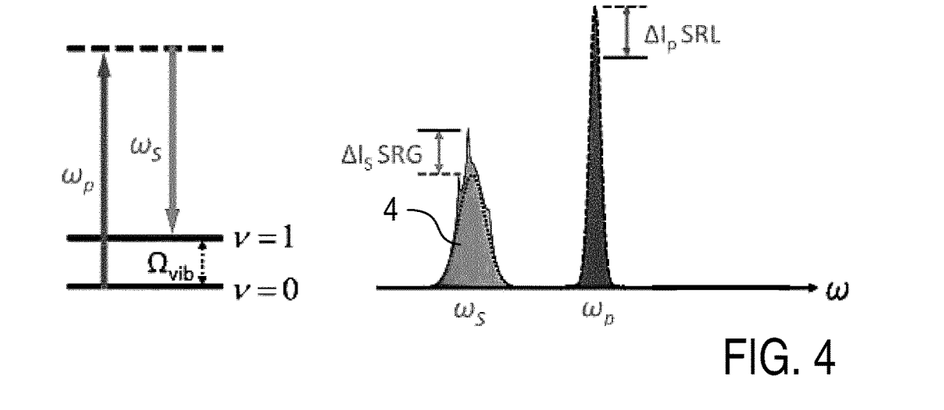
FIG. 4: an energy diagram of stimulated Raman Scattering and its representative spectrum.

The non-linear interaction obtained by the pump 2 and Stokes 3 pulses with the sample 1 is the SRS process. FIG. 4 schematically illustrates an energy diagram of SRS and its representative spectrum. Broadband coherent Raman scattering $\Omega_{vib}$ is induced in sample molecules by simultaneously irradiating the sample with a pump field, i.e. the pump pulses 2, at $\omega_p$ and a Stokes field, i.e. the Stokes pulses 3, at $\omega_s$. Solid arrows indicates laser excitation and the dashed arrow indicates the spontaneous scattering process, wherein $\Omega_{vib}$ denotes the vibrational energy. In SRS, the intensity of the pump and Stokes pulses 2, 3 is changed as a result of the scattering process as shown in the right section of FIG. 4.

Preferably, the change of the Stokes pulses is detected as the sample response pulse 4 with the field sampling method used by the invention.

Figure 5:
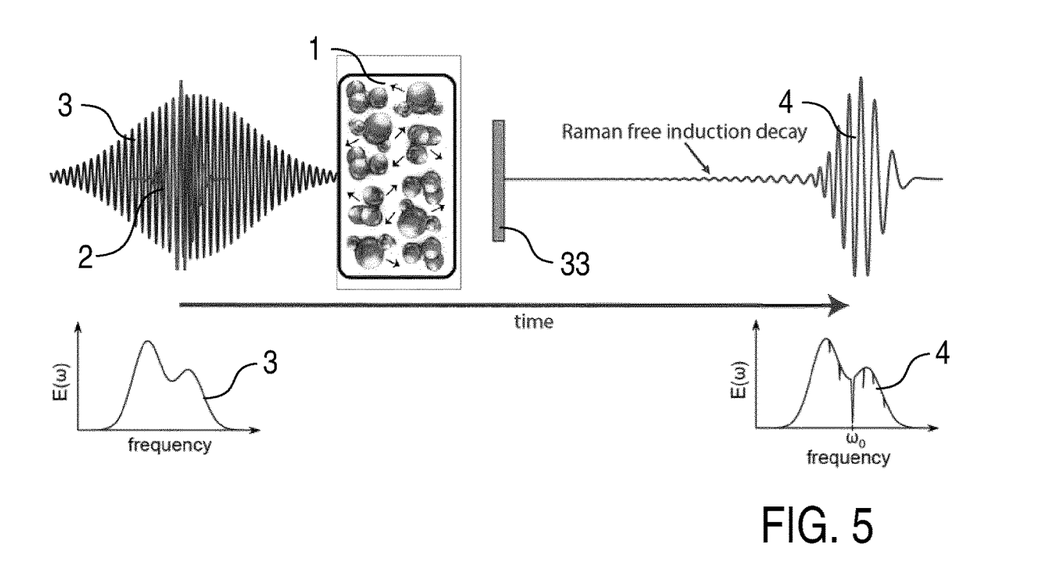
FIG. 5: broadband, few-cycle and narrowband laser fields initiating Raman-active molecular vibrational coherence in a sample.

According to FIG. 5, the broadband, few-cycle Stokes pulse 3 and the narrowband pump pulse 2 initiate Raman-active molecular vibrational coherence in the sample 1. After interaction with the sample 1 consisting of an ensemble of molecules, the Raman molecular fingerprint is formed at the trailing edge of the changed Stokes pulse (sample response pulse 4) which, due to the broadband characteristic of the Stokes pulse 3, carries information about the entire Raman active modes in the sample 1. In the frequency domain, different Raman vibrations appear as gain (if the Stokes pulses are broadband, we only detect the gain) at different frequencies in the sample response pulse 4. The narrowband pump pulses 2 are provided to achieve spectral resolution and are spectrally filtered with the filter 33 (see FIGS. 1 and 3) after the excitation.

Figure 6:
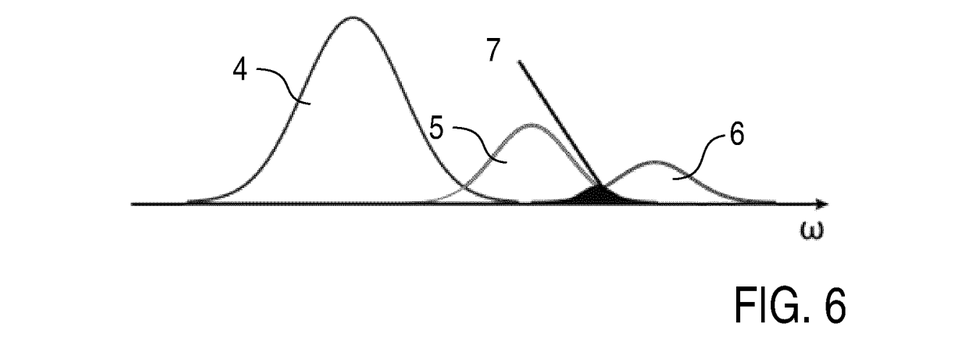
FIG. 6: an embodiment of generating spectral interference pulses.

With the scanning device 70, multiple sample points of the sample 1 are sequentially irradiated, and at each sample point the irradiating steps are successively repeated with multiple temporal probe delays set by the delay device 27. At each probe delay, a sum or difference frequency pulse 6 of a current sample response pulse 4, i.e. the intensity changed Stokes pulse, and a current probe laser pulse 5 is generated, as shown in FIG. 6. Furthermore, at each probe delay, a spectral interference pulse 7 is created by a spectral interference of the sum or difference frequency pulse 6 and the current probe laser pulse 5.

FIG. 6 shows that a nonlinear optical interaction of the linearly polarized probe laser pulses 5 with the sample response pulses 4 generates new sum frequency pulses 6 at perpendicular polarization. Interference of the spectra of probe laser pulses 5 and the sum frequency signal pulses 6 in their region with spectral overlap is shown in the dark area (interference pulse 7). The overlapped region yields the interference pulse 7 with elliptical polarization employed for the field-sensitive sampling. It is preferred that the central frequency of sample response pulses 4 is comparable to the bandwidth of the probe laser pulses 5.

With more details, the sample response pulse 4 and the probe pulse 5 with orthogonal polarization overlap in the nonlinear sampling crystal 10, producing a new delay-dependent pulsed signal through e.g. sum-frequency generation (SFG). Therefore, the phase and amplitude information of the sample response pulse 4 is mapped into the SFG pulse. The SFG pulse 6 is collected with the detection objective 32. It has an orthogonal polarization relative to the probe laser pulses 5 and has an overlap with high frequency part of the probe spectrum (see FIG. 6). By using a quarter waveplate 34 (see FIG. 3), the polarization of the probe laser pulse 5 and the SFG pulse is manipulated to achieve interference between the two pulses. Such interference pulses 7 have a polarization rotation which is detected by the ellipsometer device 40 (in analogy with the polarization rotation which occurs due to the modulation of birefringence in THz or infrared in electro-optic sampling).

Figure 3:
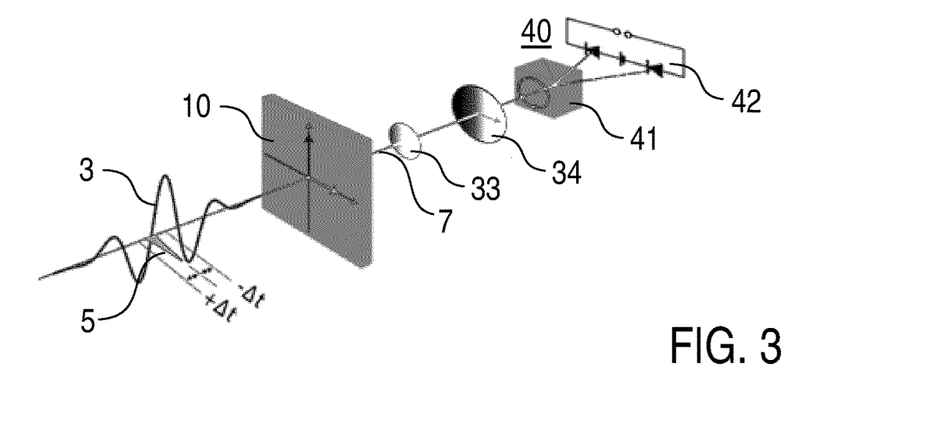
FIG. 3: an embodiment of ellipsometrically sensing a polarization state of spectral interference pulses.

The polarization rotation as a function of time delay is detected by an ellipsometer and read out by the lock-in amplifier 29A. With the illustrated embodiment, the ellipsometer device 40 preferably comprises a Wollaston prism 41 and balanced photodiodes 42, as shown in FIG. 3. Another type of an ellipsometer device can be used alternatively.

According to FIG. 3, in the absence of the interference pulses 7, the ellipsometer is aligned to equally split and balance the power of the probe laser pulses 5 at the pair of photodiodes. Therefore, the difference between the photocurrents of the two photodiodes 42 is equal to zero. In the presence of the interference pulses 7, the difference is imbalanced and varied relative to the temporal delay of the probe pulses. The electronic data from the balanced detector is recorded by using the lock-in amplifier 29A.

The lock-in amplifier 29A is connected with the computing device 50 which is adapted for calculating (constructing) the sample image 1A based on the detected sample response field. At each spatial position, the measured electric field is Fourier transformed. The recorded data form a three-dimensional matrix containing the lateral spatial information on x and y dimensions and the frequencies of the molecular response of the sample at the z dimension. Therefore, the measured matrix has the unit of nm×nm×THz.

The control device 60, like a control computer, is coupled with the laser source device 20, in particular the delay device 27, the modulation device 29 and optionally also the solid state laser 21, for setting operation conditions thereof, e.g. for setting spectral coverage, the temporal probe delay and the modulation. Furthermore, the control device 60 is coupled with the ellipsometer 40 and the computing device 50, e.g. for setting measuring conditions or parameters of constructing the sample image 1A, in particular in dependency in the operation conditions of the laser source device 20.

The Raman spectrum is retrieved by detecting the time dependent polarization changes of probe laser pulses 5. The spatial resolution of the constructed image 1A is limited by the diffraction limit of the probe laser pulses 5. Raster-scanning of the excitation pulses allows for the full characterization of the sample 1.

In the inventive scheme, molecular information of the overlapped region of intensity changed Stokes pulses (sample response pulse 4) and probe laser pulses 5 are gained. To achieve the highest lateral resolution, the sample is in contact with the nonlinear medium. This way the gained molecular information at the focus of the two beams is transferred and converted to the read-out signal in the nonlinear medium immediately and before the diffraction sets in.

In complex samples composed of a large number of molecules, the sample response pulse 4 (molecular response wave, here, Raman free induction decay) extends over about 2 to 3 ps behind the excitation pulses 2, 3 corresponding to the dephasing time of the molecular vibrations in liquid phase. This response carries an imprint of the vibrations of all the molecular constituents of the sample (see FIG. 5). Exciting molecules impulsively with ultrashort femtosecond pump pulses has three direct benefits: i) it allows for simultaneous excitation and detection of the molecular ensemble in the sample ii) the temporal confinement of the excitation pulses to few femtoseconds allows for temporal filtering of the Raman molecular response, resulting in high signal to noise ratio, and high detection sensitivity iii) coherent Raman scattering is a third order nonlinear effect and requires high peak-intensity. Employing femtosecond excitation enables reaching the required intensity for coherent Raman excitation at lower pulse energy. Consequently, the sample is exposed to lower average power and the risk of sample's thermal damage is minimized. Moreover, the detection sensitivity and dynamic range are enhanced by increasing the peak power of the excitation pulses and employing the novel field detection technology.

Figure 7:
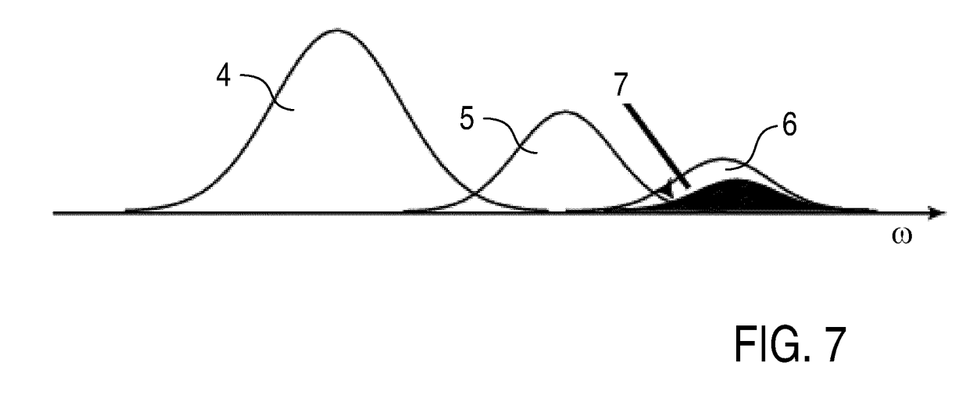
FIG. 7: an embodiment of generating higher-order spectral interference pulses.

As an alternative to the scheme of Figure, 6, spectral interference pulses 7 can be created by a spectral interference of the higher harmonic of the sample response pulses 4 and higher harmonics of the probe laser pulses 5 in the sampling crystal 10, as shown in FIG. 7. In high-order field sampling, the spectral filtering is moved to higher frequency. Here the spectral overlap (interference pulse 7) between the high frequency portion of the generated sum frequency pulse 6 and the generated second harmonic of the probe laser pulse 5 is filtered and detected. Advantageously, such signals can be easily generated in a quartz sampling crystal allowing for a cost-effective detection compared with the use of a BBO sampling crystal. Moreover, detection at higher frequencies allows for a higher spatial resolution.

With an exemplary application, neurotransmitters, like e.g. acetylcholine, can be imaged with the inventive technique. Neurotransmitters are the messenger in chemical synapses between neurons and neurons and other cell types. Investigation on their distribution and concentration has two major applications: 1) their dysfunction is the root of many neurological disorders such as Schizophrenia, depression, Parkinson disease, and Alzheimer disease. 2) measuring their distribution allows for mapping of the neural circuits. However, conventional detecting their distribution and concentration at the sub-cellular level has been challenging, as they are small molecules and using fluorescent probes may not necessarily reflect their behavior.

In summary, the invention provides a new generation technique of imaging, preferably biological samples, including a movement towards super-resolution, label-free visualizing subcellular structures in a nonperturbative, non-invasive manner. The invention allows reaching an unprecedented sensitivity and dynamic range essential in particular for biomedical advancements. In particular by employing bright, ultrabroadband, femtosecond electromagnetic forces at petahertz frequencies, molecular vibrations are driven coherently and efficiently. Temporal confinement of the excitation pulses to few femtoseconds allows for temporal filtering of the molecular response and therefore, high signal to noise ratio, and high detection sensitivity is achieved. The same laser provides optical pulses with ultrashort duration to directly access and detects the field oscillations of the emitted molecular response via electric-field sampling. This detection metrology allows for simultaneous and broadband detection of the entire molecular fingerprint and beyond with high dynamic range and sensitivity down to quantum shot noise. Most importantly, due to the electric-field imaging in this scheme sub-diffraction limited, chemically sensitive images can be constructed without the need for labelling molecules or using structured light. The advanced near-infrared femtosecond source in combination with the novel field detection technology enables acquiring the complete fingerprint of complex biological molecules non-invasively with a spatial resolution and sensitivity exceeding that of any previously demonstrated method, for the first time. The present new generation of laser-driven biological microscopy provides a dramatic leap in sensitivity, dynamic range, spatial resolution, and non-invasiveness.

The features of the invention disclosed in the above description, the drawings and the claims can be of significance individually, in combination or sub-combination for the implementation of the invention in its different embodiments.

The invention claimed is:
1. A microscopic imaging method for creating a microscopic sample image of a sample to be investigated, comprising the steps of
arranging the sample on a sampling crystal,
irradiating the sample with excitation laser pulses and
generating sample response pulses with a sample response field as a result of an interaction of the excitation laser pulses with the sample, irradiating the sampling crystal with probe laser pulses being temporally synchronized with the excitation laser pulses and spatially overlapped with the sample response pulses in the sampling crystal, wherein the probe laser pulses have a shorter wavelength than the excitation laser pulses, detecting the sample response field by electric-field sampling with the sampling crystal, using the sample response pulses and the probe laser pulses, and calculating the sample image based on the detected sample response field, wherein the excitation laser pulses have a wavelength in a range from mid-infrared to visible light and the sample response pulses are created by a coherent interaction process induced in the sample and with a fixed phase relationship relative to the excitation laser pulses, the sampling crystal is a non-centrosymmetric crystal, the irradiating step is repeated at multiple sample points, where the sample and the probe laser pulses are focused to the sampling crystal, wherein at each sample point the irradiating steps are successively repeated with multiple temporal probe delays of the probe laser pulses relative to the excitation laser pulses, at each probe delay, a sum or difference frequency pulse of a current sample response pulse and a current probe laser pulse is generated, and at each probe delay, a spectral interference pulse is created by a spectral interference of the sum or difference frequency pulse and the current probe laser pulse, the detecting step includes sensing a polarization state of the spectral interference pulse by an ellipsometer device at each probe delay, wherein the local sample response field at the sample point is derived from polarization states sensed at all probe delays, and the sample image is calculated based on the sample response field detected at the sample points, and the excitation laser pulses comprise pump pulses and Stokes pulses and the coherent interaction process comprises stimulated Raman scattering, induced in the sample by the pump and Stokes pulses, wherein the sample response pulses are intensity changed Stokes pulses resulting from the stimulated Raman scattering, wherein at each sample point the sum or difference frequency pulses are created by phase-matched, second order nonlinear interaction between the sample response pulses and probe laser pulses, and the spectral interference pulses are created by superimposing the sum or difference frequency pulses with the probe laser pulses.

2. The microscopic imaging method according to claim 1, wherein
the Stokes pulses are broadband laser pulses.

3. The microscopic imaging method according to claim 1, wherein
the excitation and probe laser pulses are focused with reflective optics.

4. The microscopic imaging method according to claim 1, wherein
the probe laser pulses have a center wavelength equal to or below half of the central wavelength of excitation laser pulses.

5. The microscopic imaging method according to claim 1, wherein
the excitation and probe laser pulses are created with a repetition frequency of at least 1 MHz.

6. The microscopic imaging method according to claim 1, wherein
the excitation and probe laser pulses are created by one single laser source device.

7. The microscopic imaging method according to claim 6, wherein creating the excitation and probe laser pulses comprises
creating initial laser pulses with a solid state or fiber laser, said initial laser pulses having a center wavelength in near infrared spectra range and a pulse duration below 500 fs,
temporally compressing the initial laser pulses with a first gas-filled optical fiber and an arrangement of chirped mirrors, wherein the temporally compressed laser pulses have a pulse duration below 10 fs,
creating stabilized CEP laser pulses with constant carrier-phase-relationship by intra-pulse difference frequency generation of the temporally compressed laser pulses,
spectrally broadening the CEP laser pulses with a second gas-filled optical fiber, so that broadband pulses are created, and
splitting the broadband pulses to different spectral regions of the excitation and probe laser pulses by broadband beam splitters.

8. The microscopic imaging method according to claim 1, wherein
at least one of the excitation laser pulses and the probe laser pulses are subjected to a modulation, and
the polarization states of the spectral interference pulses are sensed with frequency locking relative to the modulation.

9. The microscopic imaging method according to claim 1, wherein
multiple sample images are collected with temporal resolution.

10. A microscopic imaging apparatus, which is configured for conducting the microscopic imaging method according to claim 1, said microscopic imaging apparatus comprising
a sampling crystal being arranged for accommodating the sample,
an excitation laser source being configured for irradiating the sample through imaging optics with excitation laser pulses, so that sample response pulses with a sample response field can be generated as a result of an interaction of the excitation laser pulses with the sample,
a probe laser source being configured for irradiating the sampling crystal through the imaging optics with probe laser pulses and being temporally synchronized with the excitation laser source, so that the probe laser pulses can be spatially overlapped with the sample response pulses in the sampling crystal, wherein the probe laser source is configured for creating the probe laser pulses with a wavelength shorter than the excitation laser pulses,
an ellipsometer device being configured for detecting the sample response field by electric-field sampling with the sampling crystal, using the sample response pulses and the probe laser pulses,
a computer device being configured for calculating the sample image based on the detected sample response field, and a control device being configured for controlling the excitation laser source, the probe laser source and the ellipsometer device, wherein the excitation laser source is configured for creating the excitation laser pulses in a wavelength range from mid-infrared to visible light and for irradiating the sample with the excitation laser pulses such that the sample response pulses can be created by a coherent interaction process induced in the sample and with a fixed phase relationship relative to the excitation laser pulses, the sampling crystal is a non-centrosymmetric crystal, the imaging optics are configured for focused irradiation of the sample and the sampling crystal, a delay device is arranged for irradiating the sampling crystal with the probe laser pulses with an adjustable delay relative to the excitation laser pulses, the control device is configured for repeating the irradiating steps by a scanning device at multiple sample points, such that at each sample point the irradiating steps are successively repeated with multiple temporal probe delays of the probe laser pulses relative to the excitation laser pulses, at each probe delay, a sum or difference frequency pulse of a current sample response pulse and a current probe laser pulse is generated, and at each probe delay, a spectral interference pulse is created by a spectral interference of the sum or difference frequency pulse and the current probe laser pulse, the ellipsometer device is arranged for sensing a polarization state of the spectral interference pulse at each probe delay, wherein the local sample response field at the sample point can be derived from the polarization states sensed at all probe delays, and the computer device is configured for calculating the sample image based on the sample response field detected at the sample points.

11. A microscopic imaging method for creating a microscopic sample image of a sample to be investigated, comprising the steps of arranging the sample on a sampling crystal, irradiating the sample with excitation laser pulses and generating sample response pulses with a sample response field as a result of an interaction of the excitation laser pulses with the sample, irradiating the sampling crystal with probe laser pulses being temporally synchronized with the excitation laser pulses and spatially overlapped with the sample response pulses in the sampling crystal, wherein the probe laser pulses have a shorter wavelength than the excitation laser pulses, detecting the sample response field by electric-field sampling with the sampling crystal, using the sample response pulses and the probe laser pulses, and calculating the sample image based on the detected sample response field, wherein the excitation laser pulses have a wavelength in a range from mid-infrared to visible light and the sample response pulses are created by a coherent interaction process induced in the sample and with a fixed phase relationship relative to the excitation laser pulses, the sampling crystal is a non-centrosymmetric crystal, the irradiating step is repeated at multiple sample points, where the sample and the probe laser pulses are focused to the sampling crystal, wherein at each sample point, the irradiating steps are successively repeated with multiple temporal probe delays of the probe laser pulses relative to the excitation laser pulses, at each probe delay, a sum or difference frequency pulse of a current sample response pulse and a current probe laser pulse is generated, and at each probe delay, a spectral interference pulse is created by a spectral interference of the sum or difference frequency pulse and the current probe laser pulse, the detecting step includes sensing a polarization state of the spectral interference pulse by an ellipsometer device at each probe delay, wherein the local sample response field at the sample point is derived from polarization states sensed at all probe delays, the sample image is calculated based on the sample response field detected at the sample points and a dispersion setting is provided such that the probe laser pulses have maximum frequency compression in the sampling crystal.

12. A microscopic imaging method for creating a microscopic sample image of a sample to be investigated, comprising the steps of arranging the sample on a sampling crystal irradiating the sample with excitation laser pulses and generating sample response pulses with a sample response field as a result of an interaction of the excitation laser pulses with the sample, irradiating the sampling crystal with probe laser pulses being temporally synchronized with the excitation laser pulses and spatially overlapped with the sample response pulses in the sampling crystal, wherein the probe laser pulses have a shorter wavelength than the excitation laser pulses, detecting the sample response field by electric-field sampling with the sampling crystal, using the sample response pulses and the probe laser pulses, and calculating the sample image based on the detected sample response field, wherein, the excitation laser pulses have a wavelength in a range from mid-infrared to visible light and the sample response pulses are created by a coherent interaction process induced in the sample and with a fixed phase relationship relative to the excitation laser pulses, the sampling crystal is a non-centrosymmetric crystal, the irradiating step is repeated at multiple sample points, where the sample and the probe laser pulses are focused to the sampling crystal, wherein at each sample point the irradiating steps are successively repeated with multiple temporal probe delays of the probe laser pulses relative to the excitation laser pulses, at each probe delay, a sum or difference frequency pulse of a current sample response pulse and a current probe laser pulse is generated, and at each probe delay, a spectral interference pulse is created by a spectral interference of the sum or difference frequency pulse and the current probe laser pulse, the detecting step includes sensing a polarization state of the spectral interference pulse by an ellipsometer device at each probe delay, wherein the local sample response field at the sample point is derived from polarization states sensed at all probe delays, the sample image is calculated based on the sample response field detected at the sample points, and the multiple spectral interference pulses are created by a spectral interference of a higher harmonic of the sample response pulses and higher harmonics of the probe laser pulses in the sampling crystal.

13. A microscopic imaging apparatus, being configured for creating a microscopic sample image of a sample to be investigated, comprising
  a sampling crystal being arranged for accommodating the sample,
  an excitation laser source being configured for irradiating the sample through imaging optics with excitation laser pulses, so that sample response pulses with a sample response field can be generated as a result of an interaction of the excitation laser pulses with the sample,
  a probe laser source being configured for irradiating the sampling crystal through the imaging optics with probe laser pulses and being temporally synchronized with the excitation laser source, so that the probe laser pulses can be spatially overlapped with the sample response pulses in the sampling crystal, wherein the probe laser source is configured for creating the probe laser pulses with a wavelength shorter than the excitation laser pulses,
  an ellipsometer device being configured for detecting the sample response field by electric-field sampling with the sampling crystal, using the sample response pulses and the probe laser pulses,
  a computer device being configured for calculating the sample image based on the detected sample response field, and
  a control device being configured for controlling the excitation laser source, the probe laser source and the ellipsometer device, wherein
  the excitation laser source is configured for creating the excitation laser pulses in a wavelength range from mid-infrared to visible light and for irradiating the sample with the excitation laser pulses such that the sample response pulses can be created by a coherent interaction process induced in the sample and with a fixed phase relationship relative to the excitation laser pulses,
  the sampling crystal is a non-centrosymmetric crystal,
  the imaging optics are configured for focused irradiation of the sample and the sampling crystal,
  a delay device is arranged for irradiating the sampling crystal with the probe laser pulses with an adjustable delay relative to the excitation laser pulses,
  the control device is configured for repeating the irradiating steps by a scanning device at multiple sample points, such that at each sample point
    the irradiating steps are successively repeated with multiple temporal probe delays of the probe laser pulses relative to the excitation laser pulses,
    at each probe delay, a sum or difference frequency pulse of a current sample response pulse and a current probe laser pulse is generated, and
    at each probe delay, a spectral interference pulse is created by a spectral interference of the sum or difference frequency pulse and the current probe laser pulse,
  the ellipsometer device is arranged for sensing a polarization state of the spectral interference pulse at each probe delay, wherein the local sample response field at the sample point can be derived from the polarization states sensed at all probe delays, and
  the computer device is configured for calculating the sample image based on the sample response field detected at the sample points, and the excitation laser source is configured for creating the excitation laser pulses comprising pump pulses and Stokes pulses and the coherent interaction process comprises stimulated Raman scattering, induced in the sample by the pump and Stokes pulses, wherein the sample response pulses are intensity changed Stokes pulses resulting from the stimulated Raman scattering, wherein the control device is configured such that at each sample point
  sum or difference frequency pulses are created by phase-matched, second order nonlinear interaction between the sample and probe laser pulses, and
  the spectral interference pulses are created by superimposing the sum or difference frequency pulses with the probe laser pulses.

14. The microscopic imaging apparatus according to claim 13, wherein
  the excitation laser source is configured for creating the Stokes laser pulses are broadband laser pulses.

15. The microscopic imaging apparatus according to claim 13, wherein
  the imaging optics comprise reflective optics.

16. The microscopic imaging apparatus according to claim 13, wherein
  the probe laser source is configured for creating the probe laser pulses with a center wavelength equal to or below half of a central wavelength of excitation laser pulses.

17. The microscopic imaging apparatus according to claim 13, wherein
  the probe laser source and the excitation laser source are configured for creating the excitation and probe laser pulses with a repetition frequency of at least 1 MHz.

18. The microscopic imaging apparatus according to claim 13, wherein
  the probe laser source and the excitation laser source are provided by a single laser source device.

19. The microscopic imaging apparatus according to claim 18, wherein the laser source device comprises
  a solid state or fiber laser being configured for creating initial laser pulses with a center wavelength in near infrared spectra range and a pulse duration below 500 fs,
  a first gas-filled optical fiber and an arrangement of chirped mirrors being configured for temporally compressing the initial laser pulses to a pulse duration below 10 fs,
  a difference frequency generation unit being configured for creating stabilized CEP laser pulses with constant carrier-phase-relationship by intra-pulse difference frequency generation of the temporally compressed laser pulses,
  a second gas-filled optical fiber being configured for spectrally broadening the CEP laser pulses, so that broadband pulses are created, and
  broadband beam splitters being configured for splitting the broadband pulses to different spectral regions of the excitation and probe laser pulses.

20. The microscopic imaging apparatus according to claim 13, further comprising
  a modulation device being configured for subjecting at least one of the excitation laser pulses and probe laser pulses to a modulation, and
  the ellipsometer device is configured for sensing the polarization states of the spectral interference pulses with frequency locking relative to the modulation.

21. The microscopic imaging apparatus according to claim 13, wherein
the control device is configured for controlling the excitation laser source, the probe laser source and the ellipsometer device such that multiple sample images are collected with temporal resolution.

22. A microscopic imaging apparatus, being configured for creating a microscopic sample image of a sample to be investigated, comprising
a sampling crystal being arranged for accommodating the sample,
an excitation laser source being configured for irradiating the sample through imaging optics with excitation laser pulses, so that sample response pulses with a sample response field can be generated as a result of an interaction of the excitation laser pulses with the sample,
a probe laser source being configured for irradiating the sampling crystal through the imaging optics with probe laser pulses and being temporally synchronized with the excitation laser source, so that the probe laser pulses can be spatially overlapped with the sample response pulses in the sampling crystal, wherein the probe laser source is configured for creating the probe laser pulses with a wavelength shorter than the excitation laser pulses,
an ellipsometer device being configured for detecting the sample response field by electric-field sampling with the sampling crystal, using the sample response pulses and the probe laser pulses,
a computer device being configured for calculating the sample image based on the detected sample response field, and
a control device being configured for controlling the excitation laser source, the probe laser source and the ellipsometer device, wherein
the excitation laser source is configured for creating the excitation laser pulses in a wavelength range from mid-infrared to visible light and for irradiating the sample with the excitation laser pulses such that the sample response pulses can be created by a coherent interaction process induced in the sample and with a fixed phase relationship relative to the excitation laser pulses,
the sampling crystal is a non-centrosymmetric crystal
the imaging optics are configured for focused irradiation of the sample and the sampling crystal,
a delay device is arranged for irradiating the sampling crystal with the probe laser pulses with an adjustable delay relative to the excitation laser pulses,
the control device is configured for repeating the irradiating steps by a scanning device at multiple sample points, such that at each sample point
the irradiating steps are successively repeated with multiple temporal probe delays of the probe laser pulses relative to the excitation laser pulses
at each probe delay, a sum or difference frequency pulse of a current sample response pulse and a current probe laser pulse is generated, and
at each probe delay, a spectral interference pulse is created by a spectral interference of the sum or difference frequency pulse and the current probe laser pulse,
the ellipsometer device is arranged for sensing a polarization state of the spectral interference pulse at each probe delay, wherein the local sample response field at the sample point can be derived from the polarization states sensed at all probe delays,
the computer device is configured for calculating the sample image based on the sample response field detected at the sample points, and
at least one dispersion setting component is provided such that the probe laser pulses have maximum frequency compression in the sampling crystal.

\* \* \* \* \*